US005701152A

United States Patent [19]
Chen

[11] Patent Number: 5,701,152
[45] Date of Patent: Dec. 23, 1997

[54] ARRANGEMENT FOR BILLING INTERACTIVE COMMUNICATION SERVICES

[75] Inventor: Howard Zehua Chen, Berkeley Heights, N.J.

[73] Assignee: Lucent Technologies Inc., Murray Hill, N.J.

[21] Appl. No.: 534,903

[22] Filed: Sep. 28, 1995

[51] Int. Cl.$^6$ ................................................ H04N 7/173
[52] U.S. Cl. ........................ 348/3; 348/1; 348/6; 348/12; 455/2
[58] Field of Search ........................ 455/2, 5.1, 4.2, 455/4.1, 6.1, 6.2, 6.3, 3.1; 348/3, 1, 2, 5, 12, 13, 7, 6, 8, 9, 10, 11; 358/84, 86; H04N 7/16, 7/167, 7/173

[56] References Cited

U.S. PATENT DOCUMENTS

| | | | |
|---|---|---|---|
| 4,079,414 | 3/1978 | Sullivan | 348/3 |
| 4,528,589 | 7/1985 | Block et al. | 348/1 |
| 4,590,516 | 5/1986 | Abraham | 348/12 |
| 4,710,955 | 12/1987 | Kauffman | 348/3 |
| 4,792,848 | 12/1988 | Nussrallah et al. | 348/3 |
| 5,289,271 | 2/1994 | Watson | 348/1 |
| 5,367,329 | 11/1994 | Nakagaki et al. | 348/1 |

OTHER PUBLICATIONS

R. Richard Jones, "Baseband and Passband Transport Systems for Interactive Video Services," IEEE Communications Magazine, pp. 90–101 (May 1994).

*Primary Examiner*—John K. Peng
*Assistant Examiner*—Chris Grant
*Attorney, Agent, or Firm*—D. I. Caplan

[57] ABSTRACT

Only one or only a few channels are sent at a time from curbside circuitry located in a curbside box, via a link such as either a coaxial or a fiber cable, into a customer's home TV set or personal computer. However, many more than a few channels are delivered to the curbside box from a central office or a central bank of paid video-movies to be selected by the customers. The curbside box serves a multitude of homes, a separate (narrow-band) cable running to each home from the (same) curbside switch. Each channel can be a free radio or free TV channel, a stored or an on-line newspaper pay channel, or a pay TV channel, or a pay-per-view channel. Requests from each TV set in each home (e.g., initiated by a hand-held remote control infra-red sending device) can be sent to the curbside circuitry from the home along a link such as a wire or along the same curbside-to-home cable itself. Storage of billing information with respect to each customer is accomplished by a billing recorder located in the curbside box. A relatively short link connects this billing recorder to a junction in the link that carries the request signals to the curbside box. The billing recorder has registers that record the history of each customer's requests for access to each channel. The billing recorder is provided with circuitry responsive to remote billing interrogation signals sent by one or more remote billing centers. In response to these remote billing interrogation signals, the billing recorder sends the records of the customers to the remote billing center.

14 Claims, 2 Drawing Sheets

ARRANGEMENT FOR BILLING INTERACTIVE COMMUNICATION SERVICES

FIELD OF THE INVENTION

This invention relates to methods of billing communication services that are delivered to consumers ("customers"), and more specifically to methods of billing interactive information services—including video, voice, data, and multimedia services—to consumers located in such places as homes or other building. As used herein; the term "interactive" refers to situations in which a person (e.g., the customer) can control the information being sent on an on-going or other basis.

BACKGROUND OF THE INVENTION

The present method of billing used by cable television (hereafter: "TV") suppliers is to charge each customer a flat monthly rate, regardless of which channels the customer has watched or for how long. By contrast, telephone calls are billed on a pay-per-call basis.

In addition, present methods of billing used by cable TV operators are vulnerable to rampant illegal descrambling (using commercially available descramblers), because a wideband signal containing a multitude of scrambled channels is sent to the home (albeit together with noise) via a coaxial cable that the customer can is access.

Moreover, in prior art, pay-per-view systems for cable TV delivery and billing suffer from the added problem that, in addition to the illegal descrambling problem, these systems do not work in real time—the customer must know in advance when a desired video program will be shown and must make a telephone call (in advance of a desired viewing) to the provider of the video program: the telephone call can be made, for example, via a separate telephone network.

In the prior art, also, set-top-box systems are known for the purpose of delivering interactive video services to the home. These systems are designed to accommodate data-compressed digital video signals that must be decoded in the set-top-box before these signals can be displayed on a TV set. At present this set-top-box approach is designed for the delivery of only a single-channel, data-compressed digital video signal, and it does not provide for delivery of existing analog cable TV signals or any other type of information. Moreover, because the set-top-box is located in the home and hence can be accessed by the customer should not be used to compile billing information.

Another factor to be considered is that Federal Communications Commission regulations concerning cable-service to the home presently require that a cable-service provider must carry a multitude of channels including free broadcast TV channels (the "must-carry" clause of the regulations). A pay-per-view system (typically analog) that uses existing copper wires to-the-home is undesirably bandwidth-constrained, whereas a pay-per-view system that uses a dedicated frequency band in existing coaxial cable to-the-home is expensive: it is therefore not feasible for either of these pay-per-view systems to carry free broadcast channels. There is thus a need for a single system that enables the coexistence of real-time pay-per-view (for analog channels) and of both free and paid broadcast channels In addition, it would be desirable that the information delivery system be capable of handling the transmission of digital data to the customer on a paid basis.

Another issue involved here is keeping track of channel usage by each customer. To this end, U.S. Pat. No. 5,289,271 teaches obtaining information concerning channel usage by each customer (billing information) by means of a cable-usage box. The cable-usage box includes circuitry that monitors the microwave carriers being transmitted to the customer. In this way, the technique senses the presence of a specific analog TV channel being used by the customer. This technique, however, has disadvantages such as those stemming from the need of momentary interruptions of transmission to the customer. In the case of analog TV signals, such interruptions of transmission can be very annoying to the customer. In the case of digital signals, such interruptions can cause loss of unacceptably large mounts of digital information (for example, an entire file), especially in cases in which the digital information is being set in packets with headers or trailers, or both headers and trailers.

Moreover, in prior art, billing of each customer has been done via a separate link between each customer and each billing center. Thus, for N customers, the billing required N links. Therefore it would be desirable that the system should have a billing subsystem that is capable of billing the customers using fewer links between the customers and the billing centers. Also, it would be desirable to have a system that can combine such a billing subsystem with the information delivery system ("information delivery subsystem"), in order to benefit from the advantages of both the information delivery subsystem and the billing subsystem).

SUMMARY OF THE INVENTION

This invention mitigates one or more of the foregoing disadvantages of prior art and can satisfy the above-mentioned need for a single system for transmitting both pay and free channels and for transmitting both analog and digital signals. The single system can benefit from the advantages of both the information delivery subsystem and the billing subsystem. More specifically, the invention provides an interactive system that can control the delivery of information from a neighborhood information source to the home (or other local place such as any other kind of building) in real-time and can provide for sending billing information to one or more remote billing centers on demand (interrogation) of the centers. Hereinafter a neighborhood information source, including billing circuitry located in a billing recorder, will be referred to as "curbside switch-box circuitry" or simply a "curbside box". Typically, a curbside box is located underneath or overlying a street in the neighborhood of a group of homes. The curbside box is adapted or connected (or both adapted and connected) to receive information from a multitude of remote sources of signals. These remote sources send their respective information to the curbside box via such means as analog cable TV Cables, connectors ("links") from satellite communication receivers, links from local video rental stores, links from remote video servers operated by telephone companies, links from newspaper and yellow page services, and any other links such as Internet information service links. Each of the links can carry channel(s) that can be either free broadcast channels, paid broadcast channels, pay-per-use channel(s), pay-per-hour channel(s), or pay-per-view channel(s). Moreover, each of the remote sources can send information on more than a single channel. Furthermore, such channels can be multimedia.

Typically, a single curbside box is connected to, and thus serves, a multitude of consumers, each program being selected for and by each consumer. The curbside box contains information derived from the information services supplied by the remote sources. Each consumer can select any one of the multitude of channels at any moment of time, such as by means of an infrared remote-control device that is presently used to control the programs being displayed on TV sets, video cassette recorders ("VCRs"; video tape players), and the like. Each of the channels typically carries a "program" or other form of information. The infrared remote-control device sends a coded infrared request signal to a set-top box advantageously located in close proximity to the TV set whose programs the set-top box controls. This set-top box thus receives and then sends ("transponds") a resulting coded request signal via a link to a remote control receiver (hereinafter: "remote controller") located in the curbside box. The remote controller decodes each such request signal, in order to produce a decoded signal that selects which of the channels is to be sent to the home. The resulting selected channel is then sent to the house over a single fiber or coaxial cable. Moreover, in case of selection of a paid channel, the remote controller can also send billing information to an appropriate remote billing location, such as a remote billing center.

Each channel can be, for example, a free radio or a free TV channel, a stored or an on-line newspaper pay channel, or a pay TV channel, or a pay-per-view channel (i.e., the customer must give advance notice for each viewing, and may commence viewing in the midst of a selected program, or may commence viewing at the beginning of the selected program, depending on the sender's arrangement). Requests from each TV set in each home (e.g., initiated by means of a hand-held remote control infra-red sending device) can be sent to the curbside box from the home along a link such as a wire or along the same curbside-to-home coaxial cable or optical fiber itself.

In prior art, a conventional set-top-box contains a Motion Picture Experts Group ("MPEG") decoder, and it performs complex digital signal processing and thus is essentially a personal computer contained in a set-top-box.

The entire interactive communication system of this invention thus does not favor any type of service (free or paid): the inventive system simply sends the requested information to the home.

In addition, the system comprises a billing recorder located in the curbside box. The link between each of the set-top-boxes (or its equivalent circuitry) and the curbside box has a separate junction from which a separate single-customer billing link is connected to the billing recorder. The billing recorder comprises circuitry that stores billing information, in terms of the number and kinds of requests for information made by each of the customers that the curbside box serves. In order to interrogate the billing recorder for its resulting stored billing information, each billing center is assigned the billing responsibility for one or more of the remote sources. For the purpose of billing, each such billing center has circuitry to interrogate the billing recorder. This circuitry is designed to interrogate periodically, advantageously via a single duplex billing link, only the billing information assigned to that billing center seriatim with respect to each remote source and with respect to each customer—i.e., with respect to one remote source after another and one customer after another. In addition this circuitry can be further designed to interrogate periodically, advantageously via the single duplex link, the billing information for each customer with respect to each channel supplied by each of the assigned remote sources. In response to each interrogation, the circuitry in the billing recorder is designed to send back the billing information to the appropriate billing center. In this way, the interrogation and receiving of billing information typically requires only one duplex link for all customers served by one curbside box. In addition, the interrogation circuitry can be designed to request the billing information for each customer with respect to each channel.

The billing recorder can further comprise circuitry that periodically generates an interrogation signal that interrogates, via a separate interrogation link capable of sending interrogation signals from the billing recorder to the set-top-box, each of the set-top-boxes. In response to this interrogation signal, the set-top-box generates a local billing signal and sends it back to the billing recorder. In this way, the billing recorder periodically stores information as to whether or not the set-top-box is receiving information from any of the sources and, if so, not only from which of the sources but also which of the channels of each of the sources. In this way, the billing recorder will contain a histogram not only of initial requests for information on a particular channel but also the duration of the resulting use of the channel. Thus, the billing center(s) can have circuitry to access (interrogate) the billing recorder, in order to store, compile, and evaluate viewer ratings of each channel's use—such as individual and public viewing habits of TV programs, commercials, and other information services. Also, two or more billing centers can have circuitry capable of interrogating the same channel or group of channels for various viewer-rating purposes.

If desired, any of the billing centers can be located at a location that is the same as any of the remote sources. Moreover, any of the interrogation signals can be generated at a different location from the billing center, in which case the billing link will not be duplex.

As a result of the arrangement of the billing subsystem, the consumer cannot gain access to a channel without preventing the information that the consumer has thus gained accessed to the channel ("billing information") from automatically being sent, together with the request signal, to the appropriate remote billing location ("billing center"). The reason for this inability of the customer to gain such access that the junction located on the link between the set-to-box and the remote controller is inaccessible to the customer, or its location is unknown to the consumer, or it is both inaccessible (with respect to the customer) and has an unknown location (with respect to the customer). Hence, the consumer cannot prevent the billing information from stored in the billing recorder and thereafter being sent to the appropriate remote billing center.

Moreover, in accordance with the invention, the billing recorder serves N customers, yet the billing subsystem (comprising the billing centers and the billing recorder) requires fewer than N—typically only a one—duplex link between each billing center and the billing recorder. If desired, multiplexing of the billing information being transmitted on each such duplex link obviously can be used.

In a specific embodiment, this invention involves an interactive communication system including an arrangement that provides billing information to one or more remote information sources, each source being designed to send information to a plurality of set-top-boxes each of which is possessed by a separate customer, the system comprising a billing subsystem including:

(a) a billing recorder having recording circuitry and located in a place that is either inaccessible to a number of customers greater than one, or is unknown to the customers, or is both inaccessible to the customers and is unknown to the customers; and (b) a first set of first links each of which connects a separate one of the plurality of set-top-boxes to the billing recorder, each of the set-top-boxes having circuitry that can send a local billing signal and a channel access request signal simultaneously, via a separate one of the first links, to a junction located in the curbside box, each of the first links splitting into first and second separate short links, the first short link connecting the junction to the recording circuitry of the billing recorder, and the second short link connecting the junction to a device that sends information on the channel to the set-top-box in response to the channel access request signal, whereby the billing recorder can record each time each of the customers requests access to a channel, the channel carrying information generated by any of one or more remote sources.

Advantageously, in this the system at least two of the set-top boxes are located in separate buildings. Advantageously also, the system further comprises a second set of second links, each of the second links connecting the billing center to the recording circuitry located in the billing recorder, the second links being less numerous than the number of customers, the billing center having billing interrogation circuitry that can send remote billing interrogation signals to the billing recorder via the second links.

Advantageously still further, the system further comprises a third set of third links, each of the third links connecting the recording circuitry of the billing recorder to a billing center, the third links being less numerous than the number of customers, the billing recorder having billing information sending circuitry that can send remote billing information signals to the billing center via the third links in response to the remote billing interrogation signals.

Advantageously yet further, the system further comprises a fourth set of fourth links, each of the fourth links connecting local interrogation circuitry located in the billing recorder to one of the set-top-boxes, and local interrogation circuitry located in the billing recorder capable of sending a local billing interrogation signal from the billing recorder to the set-top-box via the fourth links.

Any of the second and third links of the second and third sets can be optical fibers, coaxial cables, or wireless. Any of the first and fourth links can be twisted wires, coaxial cables, or optical fibers.

Advantageously one of the remote information sources can be a cable TV source of both pay TV and free TV channels. Another of the remote source can be a video bank of paid channels such as pay-per-view video programs.

The locations of the junctions—being in the curbside box—are thus either unknown to the customers, or are inaccessible to the customers, or both are unknown to and are inaccessible to the customers. Thus the customers cannot prevent the billing information from being stored in the billing recorder or from subsequently being sent to appropriate remote billing center(s).

DETAILED DESCRIPTION

Figure 1:
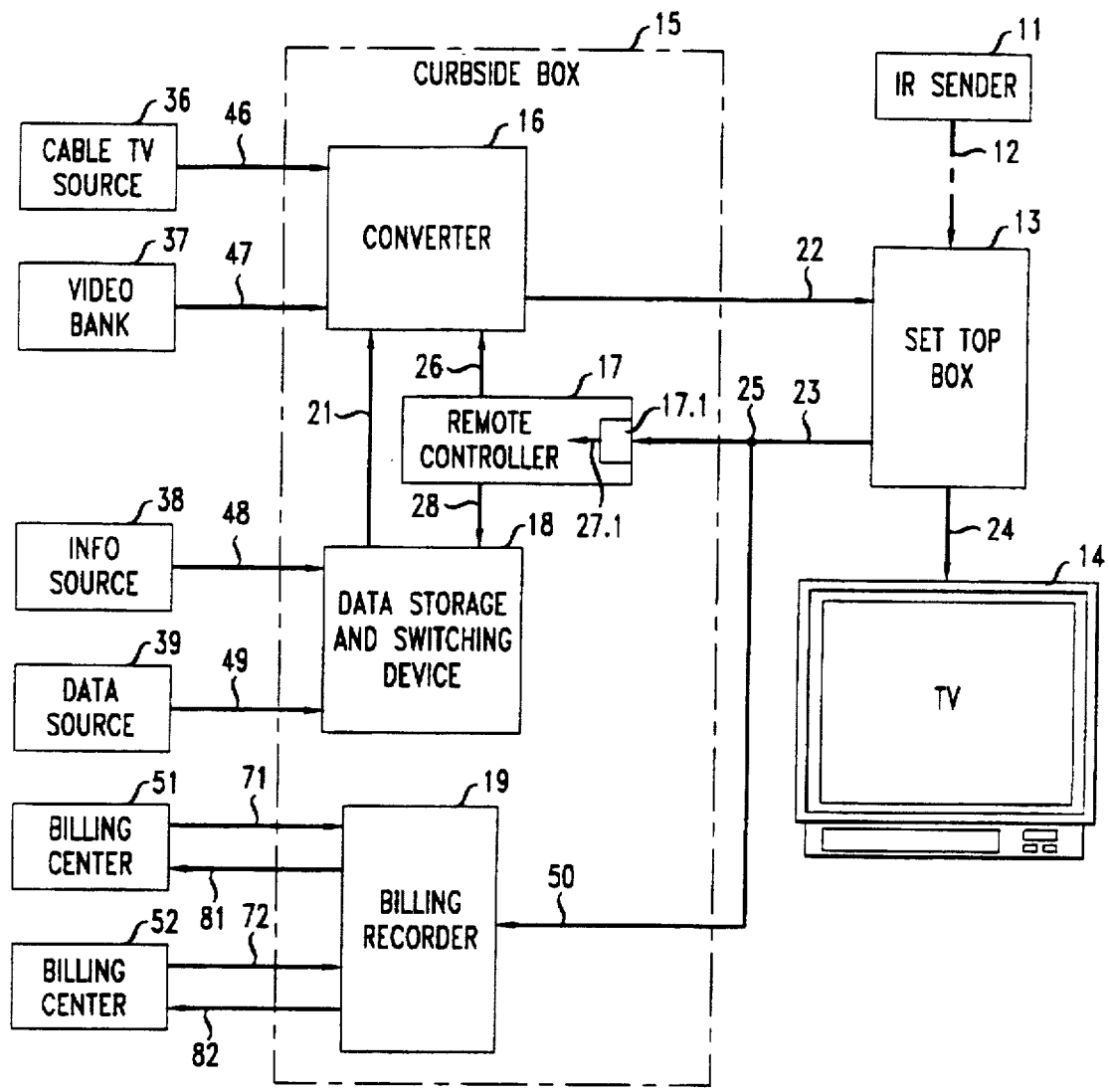
FIG. 1 is a block diagram of an interactive video system in accordance with an specific embodiment of the invention.

As shown in FIG. 1, a hand-held remote infrared sending device 11 (denoted "IR sender" in the drawing) sends a coded infrared request signal 12 to a set-top box 13. Advantageously the set-top box 13 is located in close proximity to a viewing device 14 (denoted "TV" in the drawing) whose programs the set-top box 13 controls. As explained more fully below, this viewing device 14 can be, for example, a TV set, a video cassette recorder (commonly known as a "VCR"), or a personal computer—depending upon the nature of the program that the consumer wishes to view.

The set-top box 13 is connected via a link 23 to a remote controller 17 located in the curbside box 15. In response to the coded signal 12, the set-top box is designed to send a coded request signal via the link 23 to a receiver-decoder 17.1. This receiver-decoder 17.1, located at the front end of a remote controller 17, is designed to convert the coded signal coming from the set-top box 13 via the link 23 into a decoded signal 27.1 that the remote controller 17 can process.

Typically the link 23 is an optical fiber. However, the link 23 can be a coaxial cable. Alternatively, it can be a twisted wire pair provided that the set-top box 13 contains a device that converts the coded infrared signal 12 into a coded electrical signal, as known in the art.

The operations of the infrared sending device 11 and the receiver-decoder 17.1 can be based on known methods of modulating an infrared subcarrier by means of ON-OFF coding ("ON-OFF Keying" or "Amplitude Shift Keying"). In this method, the intensity of the infrared light beam is modulated by a low frequency subcarrier (typically, 30–80 kHz, but the range can be easily extended) in an ON-OFF manner. As a result, several (typically, five) infrared remote control links can be used in the same home without mutual interference. Thus, in a single home, several different hand-held remote control devices can be used, each for controlling a separate TV set and each using a different infrared subcarrier frequency, to enable more simultaneous users in the same home, each user controlling a separate viewing device 14.

A converter 16 has circuitry designed to receive signals on links 46 and 47 coming from remote sources 36 and 37, respectively. For example, as indicated in FIG. 1, the remote source 36 can be a cable TV source (of both free and pay TV channels) and the remote source 37 can be a video bank (i.e., a source of paid video channels such as pay-per-view video programs). Each of the links 46 and 47 can carry a multitude of respective channels on a respective multitude of carrier waves.

In response to the decoded signal 27.1 developed by the receiver-decoder 17.1, the remote controller 17 has circuitry that is designed to develop a processed signal 26 that is delivered to the converter 16. In response to this processed signal 26, the converter 16 has circuitry that is designed to send the customer-selected (customer-requested) channel (information) to the home via a link 22, typically a coaxial cable or an optical fiber. More specifically, typically the link 22 delivers the information from the converter 16 to the home to the set-top box 13 on a carrier having a frequency equal to that of the conventional TV channel 3 or 4. The set-top box 13 has circuitry that is designed to deliver this information to the viewing device 14 via a link 24. In case the links 22 and 23 are optical fibers, they can be consolidated into a single fiber, as known in the art. Likewise, in case the links 22 and 23 are coaxial cables, they can be consolidated into a single cable, as known in the art, provided that the circuitry of the system is designed so that the curbside box does not send signals to the customer at the same time that the customer sends signals to the customer.

Figure 2:
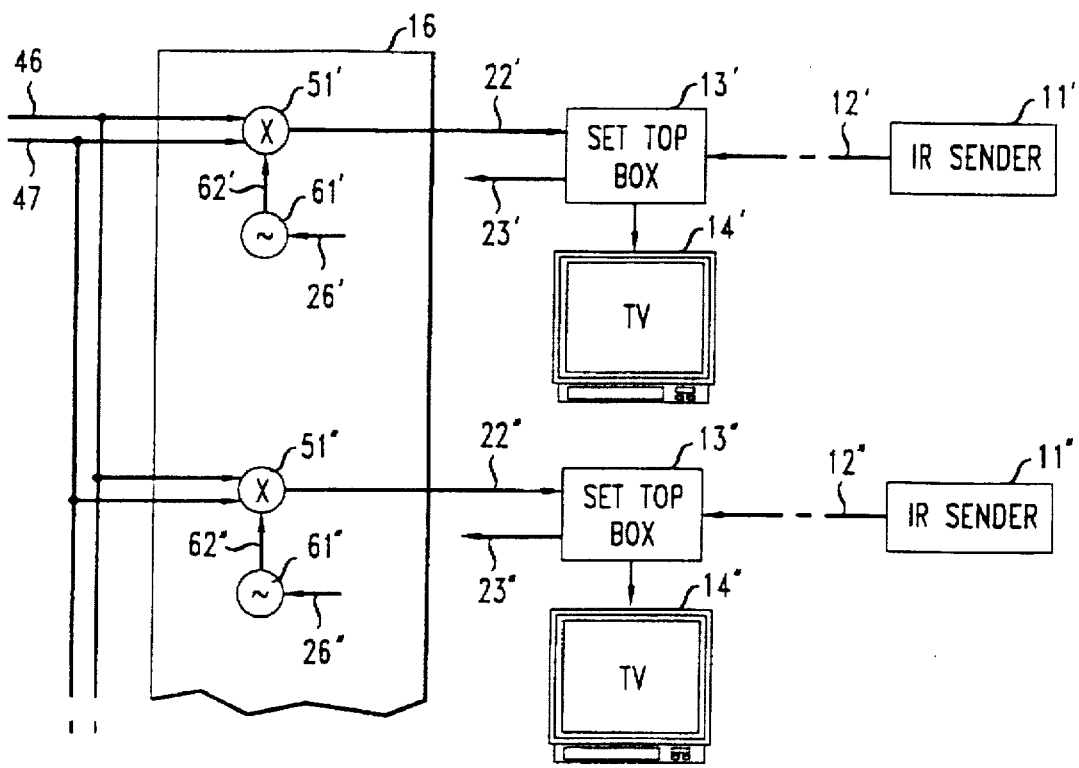
FIG. 2 is a diagram of a portion of FIG. 1 in accordance with an exemplary embodiment of the invention.

For viewing cable TV signals, the device 14 typically is a TV set or a VCR located in the home, and the Converter 16 sends only a single channel to the TV or VCR, typically via the set-top box 13, on a carrier having the frequency equal to that of the conventional TV channel 3 or channel 4, as further described below in an exemplary embodiment (FIG. 2). For other digital information, the viewing device 14 typically is a digital information receiver device, such as a personal computer including a monitor, in which case the converter 16 sends a digital signal to this device 14 via to the set-top box 13.

The arrangement shown in FIG. 1 is also useful for receiving, in the home, other forms of information, including on-line information such as Internet based services, sent to a personal computer that functions as the viewing device 14. For this purpose, a remote source 38 of such information (denoted "information source" in the drawing) has circuitry that is designed to send this information via link 48 to the data storage & switching device circuitry 18. Further, in response to a decoded signal 28 developed by the remote controller 17 (in turn, ultimately in response to the signal on the link 23 from the set-top box 13 located in the home), the data storage & switching device circuitry 18 is designed to switch the customer-requested on-line information to the converter 16, for delivery to the set-top box 13 in the home, using known methods. Such known methods include, for example, digital circuitry comprising buffering and timing circuitry typically located in the converter 16 or in the data & switching device 18, or partly in both the converter 16 and the data & switching device 18. In such cases, the set-top box 13 can be omitted, and the requested and requesting information can be sent directly to and from the personal computer over the links 22 and 23, respectively.

The arrangement shown in FIG. 1 is further useful for viewing other forms of data—such as yellow-page data, newspapers, periodicals, and the like—that are stored in the data storage & switching device circuitry 18 located in the curbside box 15. In such cases, a remote data source 39 sends such data on link 49 to the data storage & switching device circuitry 18, for delivery to the converter 16 in response to the customer's request on the link 23. The converter 16 then delivers the customer-requested information to the home via the link 22.

The links 46, 47, 48 and 49, and a link 50 can include optical fibers, coaxial cables, and other forms of remote transmission such as wireless (electromagnetic waves in space), as known in the art. Typically, whereas the link 46, 47, 48, and 49 are relatively broad-band (for example, 500 MHz to 1,000 MHz), the link 22 from the curbside box 15 can be relatively narrow-band (for example, 5 MHz to 50 MHz). Also, the remote sources 36, 37, 38, and 39 typically are located many kilometers from the curbside box 15.

In order to provide capability of billing the customers, each of the links 23 has a junction 25 at which a link 50 splits off and is connected to a billing recorder 19 located in the curbside box 15. Alternatively, the billing recorder 19 can be located in any place that is advantageously inaccessible to or is unknown to the customers, or is both inaccessible to and is unknown to the customers. For example, the junction 25 can be located inside the curbside box 15 or can be buried in the street outside the buildings being served at a location outside the curbside box 15 but still in the neighborhood of these buildings. In any case, as a matter of convenience, the billing recorder 19 will be described as being located in the curbside box 15, with the understanding that any other such location in which the billing recorder 19 is located can also be called a "curbside box."

Typically the billing recorder 19 comprises registers. A group of such registers is devoted to each customer, typically one register per customer for each type of service provided by the remote sources 36, 37, 38, and 39. Each group of these registers records the history (i.e., forms a histogram) of a particular customer's requests for services from the sources 36, 37, 38, and 39. For each customer, each of the channels (of information that can be requested) typically is assigned one of these registers. Each of the registers typically records the number of requests by the assigned customer. The billing recorder 19 contains, at its front end, a decoder (not shown), having circuitry similar to that of the decoder 17.1 located at the front end of the remote controller 17.

A billing center 51 has circuitry (not shown) that is designed to interrogate periodically, via a link 71, the billing information that is stored in the billing recorder 19, on a customer-by-customer basis. Another link 81 connects the billing recorder 19 to the billing center 51. In response to a remote billing interrogation signal transmitted over the link 71, the link 81 carries back to the billing center 51 this billing information (billing data) for each customer, this billing information pertaining to the history of requests since the last occasion on which the billing center 51 has interrogated the billing recorder 19 with respect to that particular customer. The circuitry of the billing center 51 is designed to record this history. Advantageously this history (billing data) also includes how long a particular customer has viewed a channel pursuant to each request for access to that channel. The resulting billing data are recorded at this billing center 51 for billing purposes. Typically the remote billing interrogation signals are generated by circuitry located at the billing center 51. Typically also, the remote billing center 51 is located many kilometers from the curbside box 15.

Advantageously, the billing information stored in the billing recorder 19 is encoded according to FEC ("forward error corrected") techniques, in order to prevent errors during the relatively long distance transmission of the billing information on the link 81 from the billing recorder 19 to the billing center 51. Also, the billing information transmitted from the set-top-box 13 to the billing recorder 19 can be similarly encoded by an encoder (not shown in FIG. 1) located in the set-top-box.

If there is more than one billing center, such as another exemplary billing center 52, then links 72 and 82 are arranged to connect the billing recorder 19 to this billing center 52 in the same way that the links 71 and 81 connect the billing recorder to the billing center 51. For example, each billing center can be devoted to the billing of the history of requests for information from separate ones of the remote sources 36, 37, 38, and 39.

In response to a remote billing interrogation signal transmitted over one of the links 71 or 72, circuitry in billing recorder 19 is designed to send the billing information directly, via one of the links 81 or 82, respectively, only to the billing center 51 or 52, respectively, that is sending the interrogating signal. Alternatively, in response to any interrogation signal, the circuitry in the billing recorder 19 is designed to send the billing information to all billing centers but is encoded specifically to each billing center 51, 52, and each billing center has a decoder (not shown) that can understand (i.e., decode) only the billing information pertaining to that particular billing center. Moreover, any of the remote billing centers can be located at any of the remote sources.

The links 71, 81, 72 and 82 can include wires, optical fibers, coaxial cables, and other forms of remote transmission such as wireless (electromagnetic waves in space), as known in the art. Since, for example, the links 71 and 81 are not used for transmitting signals simultaneously, they can be consolidated into a single link. Similarly the links 72 and 82 can be consolidated into a single link.

Figure 3:
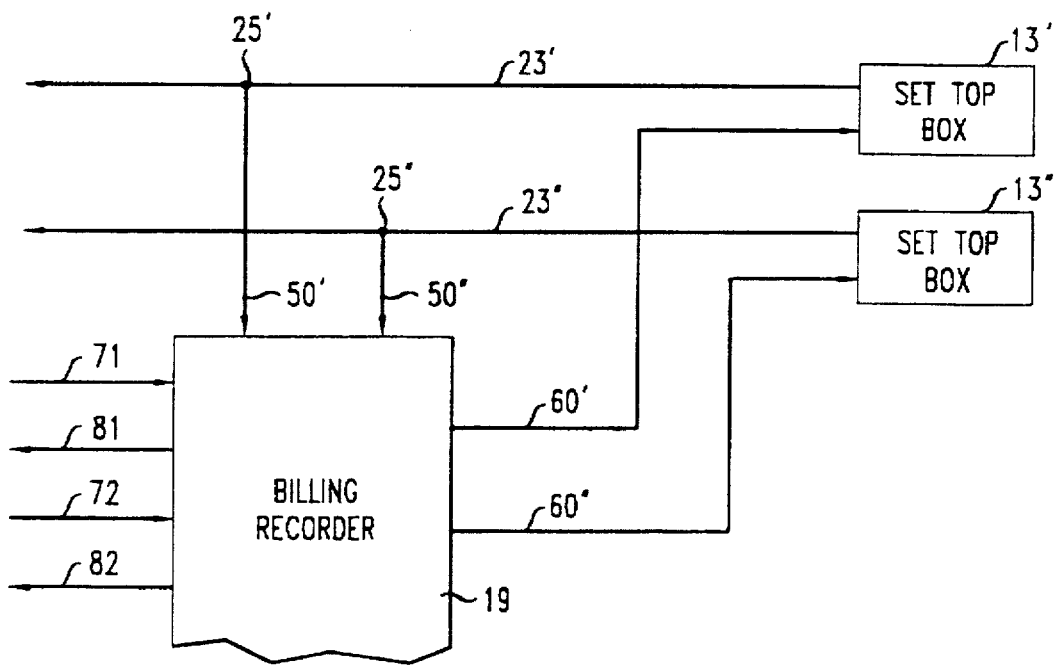
FIG. 3 is a diagram of another portion of FIG. 1 in accordance with the specific embodiment of the invention.

FIG. 2 shows a portion of the converter 16 in accordance with an exemplary embodiment. This portion shows how the converter 16 can accommodate a multiplicity of different homes (i.e., different customers). The reference-symbol-notation in FIG. 2 uses a single prime (') for denoting elements located in the fast home, a double prime (") for denoting elements located in the second home, and so forth. In each of the homes is located an infrared remote sending device 11', 11", ... each of which sends a coded signal 12', 12", ... to a separate set-top box 13', 13", ... Advantageously, each of these set-top boxes is located in close proximity to a separate viewing device 14', 14", respectively, ... whose respective programs each of the set-top boxes 13', 13", ... controls. Each of the set-top boxes 13', 13" ... sends a respective coded request signal via the respective links 23', 23" ... to the receiver-decoder 17.1 (FIG. 1) of the remote controller 17. In response thereto, the remote controller 17 processes these request signals and sends the resulting respective processed signals 26', 26", ..., to local oscillators 61', 61", ...., respectively, located in the converter 16. In response to these processed signals, the instantaneous operating frequency f', f", ...., of each of the local oscillators 61', 61", ...., respectively, is controlled, as is understood in the art. The local oscillators 61', 61" ..., are arranged to send respective sinusoidal signals 62', 62", . . . .—having frequencies equal to each of these respective frequencies f', f",...,—to mixers 51', 51",...., respectively. In response, each of the mixers 51', 51", ...., thus selects which of the channels on which one of the links 46 or 47 is sent via links 22', 22", ...., to the respective set-top boxes 13', 13", ... In response, each of the set-top boxes 13', 13", ...., respectively, has circuitry designed to send the respective customer-selected channels via each of respective links 24', 24", ...., to each of the respective viewing devices 14', 14', ...., (i.e., to each of the customers). FIG. 3 is a diagram of a portion of the billing recorder 19. This portion shows how the billing recorder can accommodate a multiplicity of different homes (i.e., different customers). As in FIG. 2, the reference-symbol-notation in FIG. 3 uses a single prime (') for denoting elements associated with the first home, a double prime (") for denoting elements associated with the second home. Although only two homes are shown in FIG. 3, there can be more than just two such homes together with associated viewing devices, set-top-boxes, and links to the single billing recorder 19. Except for the primes, elements shown FIG. 3 that have the same reference labels as those shown in FIG. 1 are the same as those previously described in connection with FIG. 1. Thus the links 50' and 50" transmit billing information from the first and second homes, respectively, to the billing recorder 19. More particularly the links 50' and 50" transmit billing information to the billing recorder 19 from the junctions 25' and 25" with the links 23' and 23", respectively. In turn, each of the links 23' and 23" is one of the above-described links that transmits the respective coded request signal from the set-top box 13 (FIG. 1) to the remote controller 17 located in the curbside box 15. As described above in connection with FIG. 1, each of the links 71 and 72 (FIG. 3) is arranged to transmit an interrogation signal from the billing centers 51 and 52, respectively, to the billing recorder 19. Each of the links 81 and 82 is arranged to transmitted billing information from the billing recorder 19 to the billing centers 51 and 52, respectively. These interrogation signals coded in such a manner as to be customer-specific and remote-source-specific—that is to say, each of them interrogates the registers in the curbside box 15 serially for obtaining the billing information with respect to a separate customer and with respect to a separate one of the remote sources assigned to the billing center. In addition, the circuitry in each of the remote sources can be designed to interrogate the registers with respect to each of the channels supplied by the remote sources assigned to the billing center that is interrogating the registers. In response to the interrogation signals, each of the links 81 and 82, is arranged to transmit the billing information to the appropriate billing center 51 and 52, respectively. Immediately after a successful interrogation of any register has thus been accomplished, the register is reset to zero. Typically, each such interrogation with respect to each customer is performed once every billing period for that customer, such as once per month.

Each of the registers located in the billing recorder 19 (FIG. 1) can also have circuitry designed to send the local billing interrogation signal periodically over the link 50 via the junction 25 to the set-to-box 13. Alternatively this resulting periodic local billing interrogation signal can be sent over a separate link (not shown in FIG. 1 but indicated, for example, as link 60' in FIG. 3). In any event, the local billing interrogation signal is thus sent to the set-top-box 13 of the customer. In this way the billing recorder can record the history of the mounts of time that the customer has viewed the channel pertaining to that register and hence pertaining to the channel assigned to that register. In such a case, the link 50, as well as the portion of the link 23 between the set-top-box 13 and the junction 25, advantageously is a duplex link. This arrangement is shown explicitly in greater detail in FIG. 3, in which additional links 60' and 60" connect the billing recorder 19 to the set-top-boxes 13' and 13", respectively, of two separate customers. These links 60' and 60" are designed to carry the periodic local billing interrogation signals from the billing recorder 19 to the set-top-boxes 13' and 13", respectively, of these customers.

Although the invention has been described in detail with reference to a specific embodiment, various modifications can be made without departing from the scope of the invention. For example, instead of any of the billing centers being located at a place removed from any of the remote sources, circuitry located within any of the billing centers can be designed to generate any of the remote billing interrogating signals and to record the appropriate billing information.

What is claimed is:

1. An interactive communication system comprising:

an arrangement that provides billing information to at least one remote information source, wherein each source sends information to a plurality of set-top-boxes, each set-top-box possessed by a separate customer;

including:

a billing recorder having recording circuitry and located in a place that is at least one of inaccessible to a plurality of customers and unknown to the customers; and a set of first links, each first link connecting a separate one of the plurality of set-top-boxes to the billing recorder, each of the set-top-boxes having circuitry that can send a local billing signal and a channel access request signal simultaneously via the connected one of the first links to a junction located in a curbside box, wherein each first link comprises a first short link and second short link, the first short link connecting the junction to the recording circuitry of the billing recorder, and the second short link connecting the junction to a device that sends information to the set-to-box in response to the channel access request signal, the billing recorder recording each time each customer requests access to a channel.

2. The system of claim 1 in which at least two of the set-top boxes are located in separate buildings.

3. The system of claim 2 further comprising a set of second links, wherein each second link connects a billing center to the recording circuitry located in the billing recorder, a number of the second links being less than a number of the plurality of customers, the billing center having billing interrogation circuitry that can send remote billing interrogation signals to the billing recorder via the second links.

4. The system of claim 3 further comprising a set of third links, wherein each third link connects the recording circuitry of the billing recorder to the billing center, a number of the third links being less than the number of customers, the billing recorder having billing information sending circuitry that can send remote billing information signals to the billing center via the third links in response to the remote billing interrogation signals.

5. The system of claim 4 further comprising a set of fourth links, wherein each fourth link connects local interrogation circuitry located in the billing recorder to one of the set-top-boxes, and the local interrogation circuitry is capable of sending a local billing interrogation signal from the billing recorder to the plurality of set-top-boxes via the fourth links.

6. The system of claim 2 further comprising a set of third links, wherein each third link connects the recording circuitry of the billing recorder to a billing center, a number of the third links being less than a number of the plurality of customers, the billing recorder having billing information sending circuitry that can send remote billing information signals to the billing center via the third links in response to remote billing interrogation signals.

7. The system of claim 2 further including one or more of the set-top boxes located in each of the buildings.

8. The system of claim 7 further comprising a set of second links, wherein each second link connects a billing center to the recording circuitry of the billing recorder, a number of the second links being less than a number of the plurality of customers, the billing center having billing interrogation circuitry that can send remote billing interrogation signals to the billing recorder via the second links.

9. The system of claim 8 further comprising a set of third links, wherein each third link connects the recording circuitry of the billing recorder to the billing center, a number of the third links being less than a number of the plurality of customers, the billing recorder having billing information sending circuitry that can send remote billing information signals to the billing center via the third links in response to the remote billing interrogation signals.

10. The system of claim 9 further comprising a set of fourth links, wherein each fourth link connects local interrogation circuitry located in the billing recorder to one of the set-top-boxes, and the local interrogation circuitry is capable of sending a local billing interrogation signal from the billing recorder to the plurality of set-top-boxes via the fourth links.

11. The system of claim 7 further comprising a set of fourth links, wherein each fourth link connects local interrogation circuitry located in the billing recorder to one of the set-top-boxes, and the local interrogation circuitry is capable of sending a local billing interrogation signal from the billing recorder to the plurality of set-top-boxes via the fourth links.

12. The system of claim 1 further comprising a set of second links, wherein each second link connects a billing center to the recording circuitry located in the billing recorder, a number of the second links being less than a number of the plurality of customers, and the billing center having billing interrogation circuitry that can send remote billing interrogation signals to the billing recorder via the second links.

13. The system of claim 12 further comprising a set of third links, wherein each third link connects the recording circuitry of the billing recorder to the billing center, the third links being less than the number of the plurality of customers, the billing recorder having billing information sending circuitry that can send remote billing information signals to the billing center via the third links in response to the remote billing interrogation signals.

14. The system of claim 13 further comprising a set of fourth links, wherein each fourth link connects local interrogation circuitry located in the billing recorder to one of the set-top-boxes, and the local interrogation circuitry is capable of sending a local billing interrogation signal from the billing recorder to the plurality of set-top-boxes via the fourth links.

* * * * *